July 11, 1939.　　　W. R. SPILLER　　　2,165,909
LUBRICATING SYSTEM FOR MOTOR VEHICLE ENGINES
Filed Oct. 5, 1934　　　5 Sheets-Sheet 1
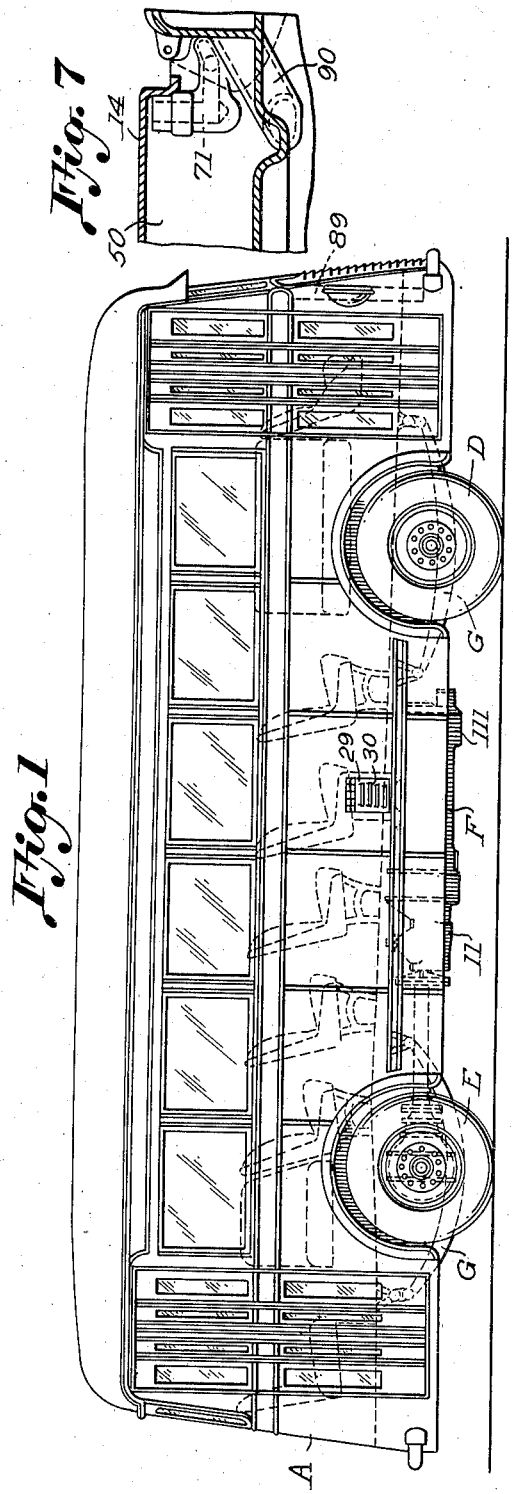
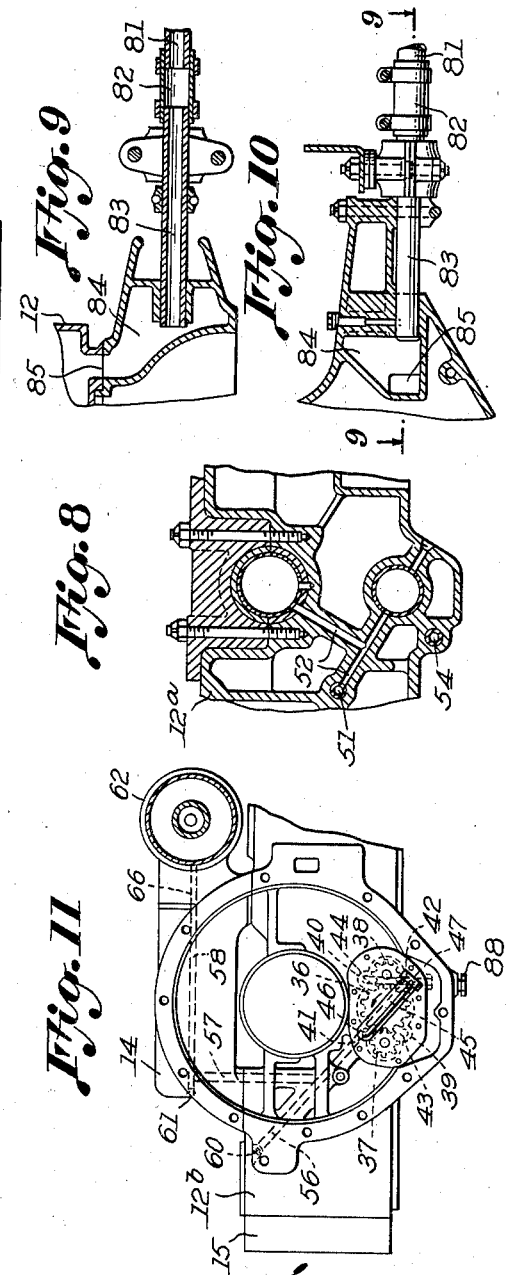
Inventor:
WILLIAM R. SPILLER
By
Attorney.

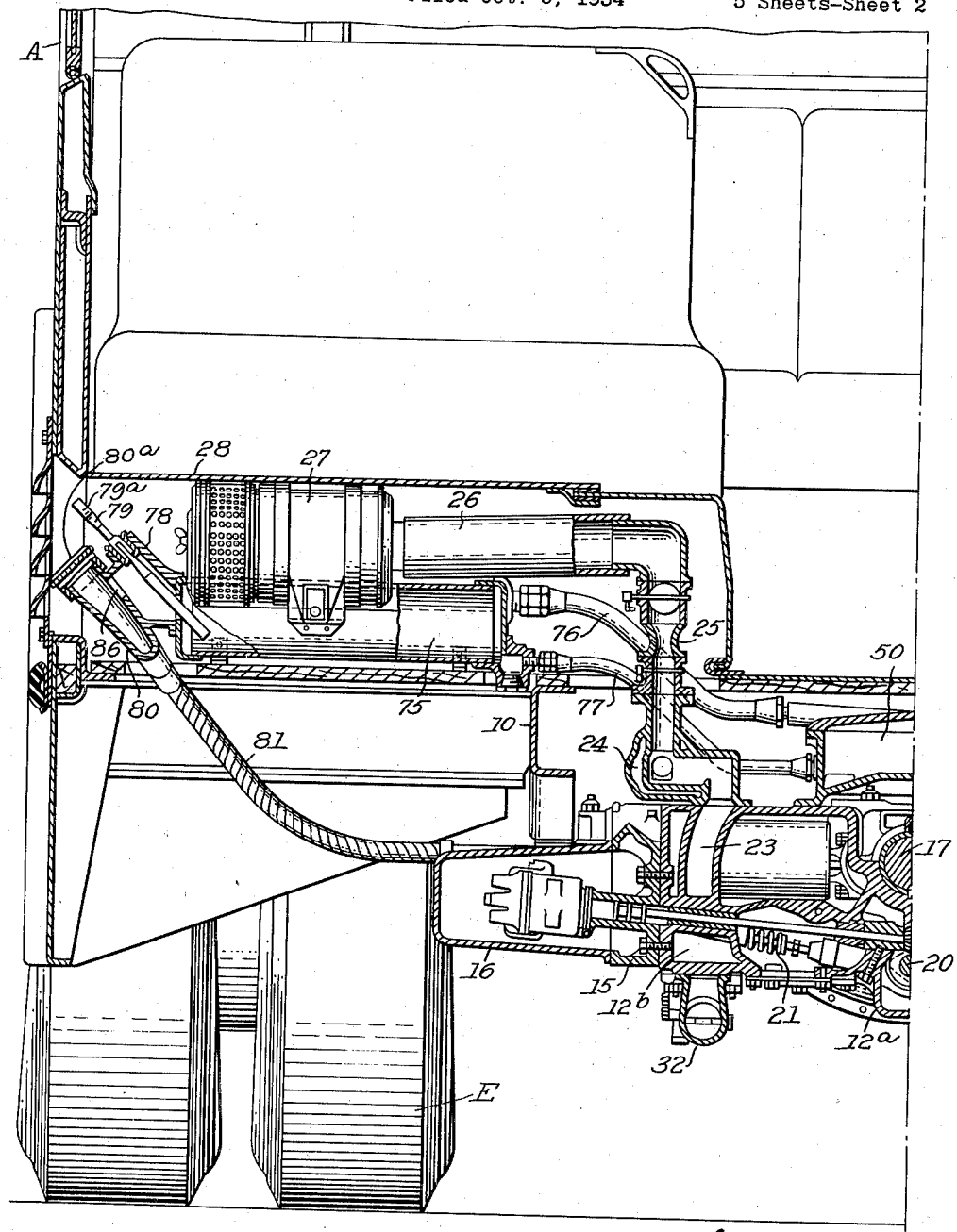

Inventor:
WILLIAM R. SPILLER
By [signature]
Attorney.

July 11, 1939.  W. R. SPILLER  2,165,909
LUBRICATING SYSTEM FOR MOTOR VEHICLE ENGINES
Filed Oct. 5, 1934  5 Sheets-Sheet 4

INVENTOR.
William R. Spiller.
BY
RM Cooper
ATTORNEY.

July 11, 1939.   W. R. SPILLER   2,165,909
LUBRICATING SYSTEM FOR MOTOR VEHICLE ENGINES
Filed Oct. 5, 1934   5 Sheets-Sheet 5
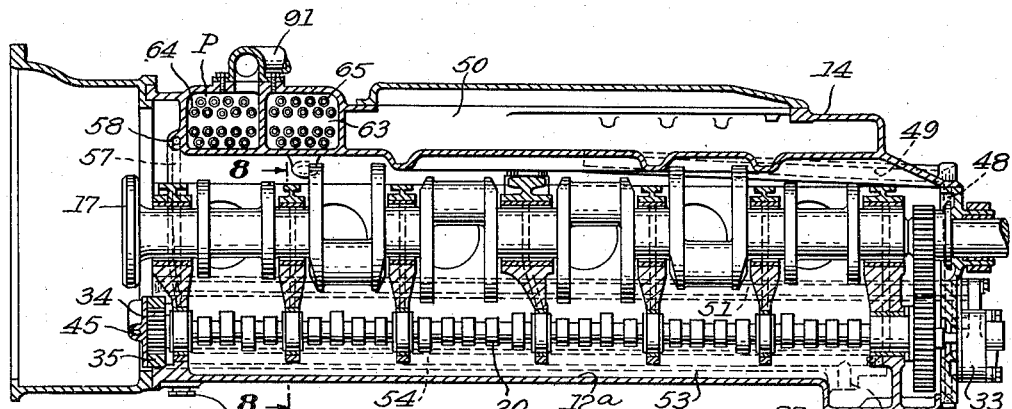
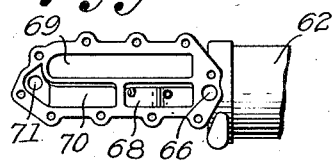
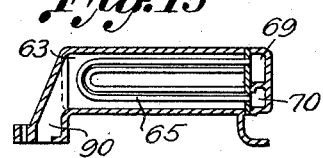
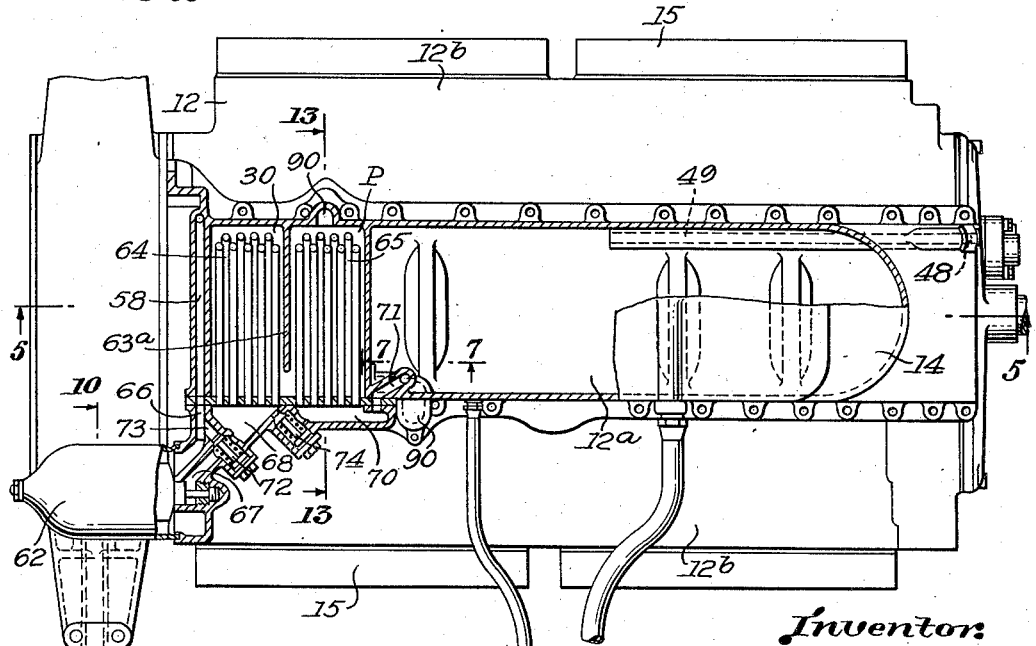
Inventor:
WILLIAM R. SPILLER.
By
Attorney.

Patented July 11, 1939

2,165,909

UNITED STATES PATENT OFFICE 2,165,909

LUBRICATING SYSTEM FOR MOTOR VEHICLE ENGINES

William R. Spiller, Cleveland, Ohio, assignor to The White Motor Company, Cleveland, Ohio, a corporation of Ohio Application October 5, 1934, Serial No. 747,008

5 Claims. (Cl. 184—6)

This invention relates to a lubricating system for motor vehicle engines.

One object of the invention is to provide an improved construction for motor buses and other vehicles of the type in which the engine is located under the floor, which will facilitate the attainment of a low floor level.

A second object of the invention is to provide a construction for vehicles of the type above set forth which will afford convenience in measuring and replenishing the oil in the lubricating system of the engine.

A third object of the invention is to provide an engine lubricating system particularly adapted for use in an engine of a vehicle of the type above set forth.

A fourth object of the invention is to provide an efficient engine lubricating system of the dry sump type.

Other objects will appear in the following description when read in connection with the accompanying drawings, in which:

Figure 1 is a side elevation of a motor bus embodying the present invention.

Figures 2 and 2A are central cross-sectional views of lateral halves of the structural embodiment of my invention looking toward the rear.

Figure 5 is a longitudinal cross section of the engine of the bus, the section being taken on line 5—5 of Figure 6.

Figure 6 is a fragmentary plan view of the engine, certain parts being broken away in order to show internal construction.

Figure 7 is a fragmentary sectional view of the engine taken on line 7—7 of Figure 6.

Figure 8 is a fragmentary sectional view of the engine taken on a line corresponding with line 8—8 of Figure 5.

Figure 9 is a section view of a portion of the engine and of one of the engine supports taken on line 9—9 of Figure 10.

Figure 10 is a section view of a portion of the engine and of one of the engine supports taken on line 10—10 of Figure 6.

Figure 11 is a fragmentary elevation view of the rear end of the engine with the bell housing removed and with the oil cleaner shown in section.

Figure 12 is a detail view of a casting employed in the construction of the rear end of the engine, together with a fragmentary side view of an oil cleaner supported thereby, the view being taken so as to show the interior construction of the casting, and Figure 13 is a section view taken through the upper part of the engine on a line corresponding with line 13—13 of Figure 6.

Figure 2A:
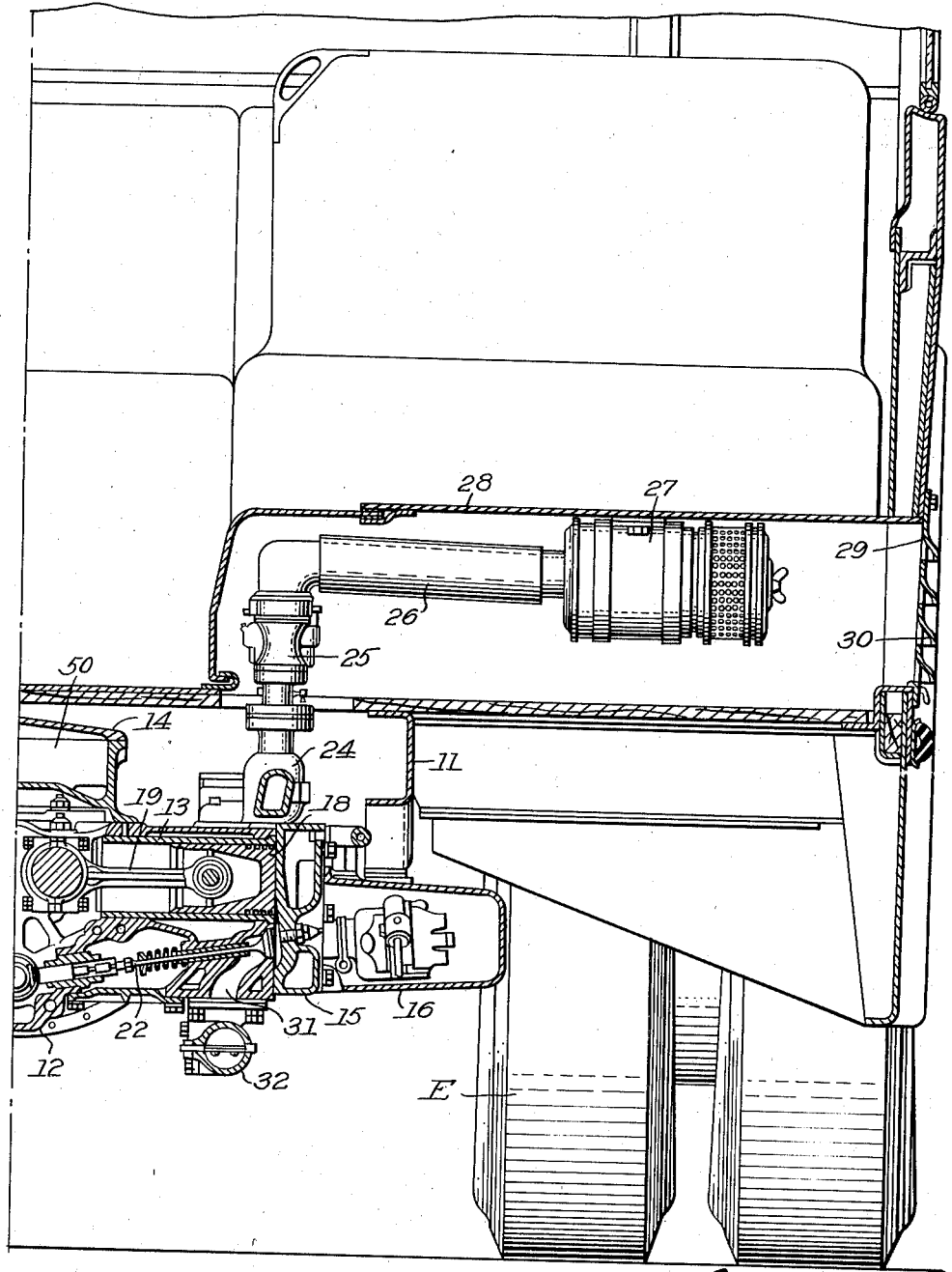
Figure 3:
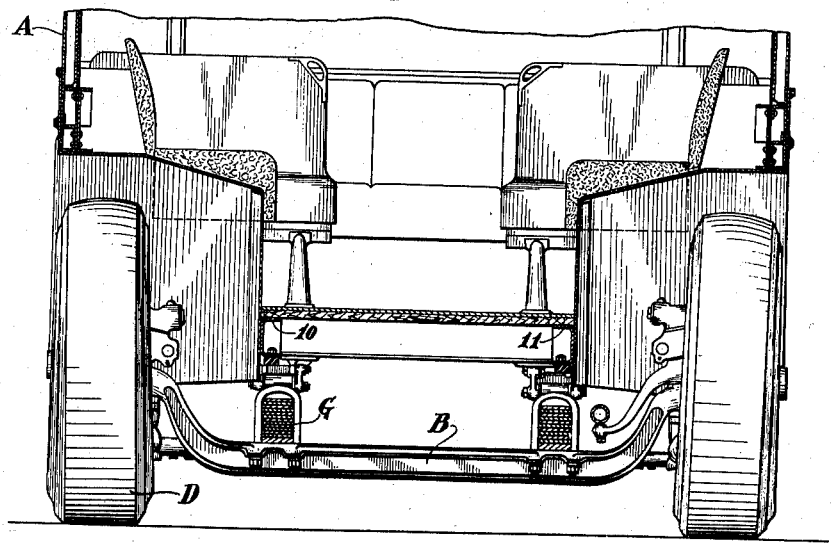
Figure 3 is a fragmentary sectional view of the bus taken immediately in front of the front axle and looking towards the rear of the bus, certain parts in the rear of the section being omitted in the interest of clarity.
Figure 4:
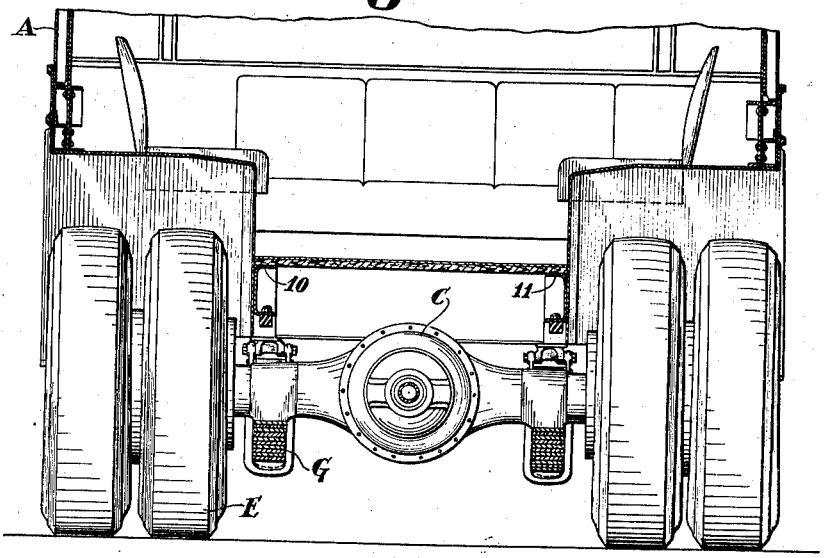
Figure 4 is a fragmentary sectional view of the bus taken immediately in front of the rear axle and looking towards the rear of the bus.

Referring to the drawings, the bus therein illustrated comprises generally a body A, front and rear axles B and C, front and rear wheels D and E, and a power plant F embodying an engine $m$ and transmission or gear box $n$.

The body A is provided with a load supporting and stress resisting frame built as a unitary structure therein, and is mounted upon the axles B and C by means of springs G without the intervention of a chassis frame.

The power plant F is supported from two members 10 and 11 of the under-structure of the body in a position midway between the axles. It is operatively connected with the rear wheels E through a power transmitting mechanism similar to that employed in a conventional automobile.

The engine $m$ is constructed with horizontally disposed cylinders in order to minimize its projection beneath the floor of the bus, and to the same end is provided with a lubricating system of the dry sump type embodying a shallow drainage or receiving reservoir. For the purpose of definition it may be termed a horizontal dry sump engine.

Generally described, the engine $m$ comprises a casting 12 formed with a crankcase portion 12a and cylinder supporting portions 12b, cylinder sleeves 13, a crankcase cover 14, cylinder heads 15, cylinder head covers 16, a crankshaft 17, pistons 18, connecting rods 19, a camshaft 20, and inlet and exhaust valves 21 and 22.

The cylinders at the different sides of the engine are provided with separate fuel induction systems of the down-draft type. The system for each set of cylinders comprises canals 23 formed in the casting 12, a manifold 24 mounted on the upper side of the casting 12, a carburetor 25 mounted on an extension of the manifold, a breather pipe 26 extending laterally from the carburetor, and an air cleaner 27 attached to the end of the breather pipe. The carburetors 25 extend above the floor of the bus and are located in rectangular housings 28 disposed beneath two seats located at opposite sides of the bus. The housings 28, which are closed at their outer ends by doors 29 formed with louvres 30, also enclose the breathing pipes 26 and the associated air cleaners 27.

The cylinders at the different sides of the engine are also provided with separate exhaust systems, the system for each set of cylinders comprising conduits 31 formed in the lower portion of the casting 12, an exhaust manifold 32 mounted on the lower side of the casting 12, and an exhaust pipe, not shown, leading towards the rear of the bus.

The lubricating system for the engine m comprises two gear pumps 33 and 34 operatively connected to opposite ends of the camshaft. The gear pump 33 at the forward end of the camshaft is of a conventional two-gear type constructed with a single outlet and a single inlet. The gear pump 34 at the rear end of the camshaft is of a less conventional type and is constructed with two inlets and a single outlet.

Generally described, the pump 34 comprises a casing 35, a large gear 36 directly connected to the camshaft and two small idler gears 37 and 38 located at opposite sides of the large gear 36. The casing 35 is recessed away from the gears at four points forming two inlet chambers 39 and 40 and two outlet chambers 41 and 42. The inlet chambers 39 and 40 communicate with separate inlet ducts respectively indicated by the numbers 43 and 44, and the pressure chambers 41 and 42 with separate ducts 46 and 47 leading into a common outlet duct 45.

In operation of the engine, the gear 36 is rotated by the camshaft in the direction of the arrow in the drawings with the result that oil is drawn into the chambers 39 and 40, and delivered therefrom into the pressure chambers 41 and 42, from where it is forced out through the ducts 46 and 47 into the duct 45.

The pump 33 at the forward end of the crankshaft communicates at its intake side through two conduits 48 and 49 with a supply reservoir 50 formed in the crankcase cover 14, wholly above the engine, and at its discharge side is connected with a manifold 51 which communicates with ducts 52 leading to the various bearings of the engine. The inlet chamber 40 of the pump 34 communicates through the duct 44 with the rear end of a drainage receiving reservoir 53 formed in the bottom of the casting 12, and the inlet chamber 39 through the duct 43 and conduits 54 and 55 with the forward end of the reservoir 53. The pressure chambers 41 and 42 of the pump 34 communicate through the ducts 46 and 47, and the duct 45, with an upwardly extending duct 56. The duct 56 communicates through a duct 57 with a transverse duct 58 leading into an oil cleaning and cooling system P located at the rear end of the cover 14. The ducts 48, 56 and 58, which extend to the outer surface of the engine, are closed at their outer ends by screw plugs 59, 60 and 61 respectively.

Generally described, the oil cleaning and cooling system P comprises a filter 62, a water chamber 63 divided into two compartments by a baffle 63a, two sets of cooling tubes 64 and 65, and an arrangement of compartments and ducts for transporting the oil to and from, and between cooling tubes 64 and 65. The duct 58 communicates at its discharge end with a duct 66 leading into the outer compartment of the filter 62. The inner compartment of the filter, which is separated from the outer compartment by a conventional filtering element, communicates through a duct 67 with a compartment 68 communicating with the lower end of the cooling tubes 64. The upper ends of the cooling tubes 64 open into a chamber 69 which communicates at its forward end with the upper ends of the cooling tubes 65. (See Figure 12 which illustrates the interior construction of the casting containing the chambers 68 and 69.) The lower ends of the cooling tubes 65 lead into a chamber 70 formed in the previously mentioned casting which communicates through a conduit 71 with the supply reservoir 50.

Mounted within the casting containing the chambers 68, 69 and 70, there is a spring pressed valve 72 which controls a passage between the conduit 67 and a duct 73 leading from the duct 66, and which is designed to permit oil to pass directly from the duct 66 into the conduit 67 and from there into the chamber 68 should the filtering element become clogged. Mounted at the forward end of the chamber 68 is a second spring pressed valve 74 which controls a passage between such chamber and the chamber 70. This valve is adapted to open and allow oil from the chamber 68 to flow directly into the chamber 70 in case the oil tubes 64 and 65 become obstructed.

Located within the housing 28 at the right hand side of the bus and above its floor, there is an auxiliary supply reservoir 75 which communicates at its top with the top of the supply reservoir 50 through a conduit 76, and at its bottom with the bottom of the supply reservoir 50 through a conduit 77. The use of such reservoir permits the engine to be constructed with a smaller depth than could otherwise be accomplished in a practical manner without reducing the capacity of the oiling system to a capacity requiring frequent refilling.

Mounted in a casting 78 at the outer end of the reservoir 75 in such a manner as to be accessible from the outer end of the housing 28 by opening the door 29, there is a removable oil measuring rod 79 of conventional design provided with a handle 79a; and formed in the casting 78 there is a filling neck 80 equipped with a closing cap 80a which is also accessible from the outer end of the housing 28 by opening the door 29. The filling neck 80 communicates at its lower end through a pipe 81, a connection 82, and a hollow member 83 with a chamber 84 formed in the flywheel housing of the engine, and through the chamber 84 by way of an opening 85 with the interior of the casting 12. At its upper end the filling neck 80 communicates with the top of the reservoir 75 through an opening 86 which limits the height of the oil in the reservoir 75, when the vehicle is in a level position, to a level below the upper end of the conduit 76, and which is so arranged that oil can be introduced into the reservoir 53 by way of the filling neck without inducing a flow of oil into the reservoir 75.

The lubricating system is designed to hold an amount of oil when full equal to the capacity of the reservoirs 50 and 75 and the cleaning and cooling system P. It is so constructed, as will be hereinafter explained, that substantially all of the oil in the system is contained within the reservoirs 50 and 75 and the system P when the engine is running.

During operation of the engine, the pump 33 draws oil from the supply reservoir 50 through the conduits 49 and 48 delivering it through the manifold 51 and the ducts 52 to the bearings of the engine. The oil discharged through the bearings of the engine collects in the reservoir 53 in the bottom of the casting 12, from whence it is drawn into the inlet chambers 40 and 39 of the pump 34 through the conduit 44, and the conduits 54 and 55. From the inlet chambers 39 and 40, the oil is delivered into the pressure chambers 41 and 42, from where it is forced through the ducts 46 and 47 into the duct 45, and through ducts 56, 57 and 58 into the outer compartment of the cleaner 62. The oil delivered into the outer compartment of the cleaner 62 passes into the inner compartment, and is delivered from there into the chamber 68 by way of the duct 67. From the chamber 68 the oil passes through the cooling tubes 64, the chamber 69, and the cooling tubes 65 into the chamber 70, and from the chamber 70 through the conduit 71 into the supply reservoir 50.

The capacity of the pump 34 is such that either side of the pump acting alone is capable of drawing a much greater volume of oil from the reservoir 53 than is delivered thereto by the pump 33. As a result, any oil contained in the reservoir 53 at starting of the engine is quickly pumped into the upper reservoirs 50 and 75, and the reservoir 53 thereafter maintained substantially dry of oil, notwithstanding inclination of the engine resulting in a drainage of the oil to one end of such reservoir. After the delivery into the upper reservoirs of any oil which may have accumulated within the reservoir 53, the volume of oil taken from the supply reservoir will be substantially equal at all times to the volume of oil delivered thereto from the conduit 71, with the result that there will be but a small transfer of oil back and forth between the reservoirs 50 and 75.

Due to the pump 34 being constructed with a capacity as described, a certain amount of air is drawn from the receiving reservoir 53, and delivered into the supply reservoir 50 by the action of such pump during operation of the engine. The air thus delivered into the supply reservoir 50 flows back to the receiving reservoir 53 through pipes 76 and 77, reservoir 75, filling neck 80, conduits 81, 82 and 83, and chamber 84, the major portion of the air being transferred between the reservoirs 50 and 75 through the pipe 76 in a manner to be admitted to the latter reservoir above the oil level when the vehicle is in a level position. As a result of the air delivered into the reservoir 50 being returned to the receiving reservoir 53 instead of being allowed to escape to atmosphere, the oil placed in suspension within the air is conserved and a material saving in oil realized.

Returning at this point in the description to the reservoir 53 in the bottom of the casting 12, such reservoir is constructed with a capacity such that it can hold all of the oil employed in the engine without flooding the combination chambers or cylinders, the height of the oil attaining a level slightly below the valves. One object of providing the reservoir 53 with the capacity as described is to permit the engine to be filled with oil when not running without danger of flooding the combustion chambers and cylinders. A further object is to avoid flooding the combustion chambers and cylinders with oil in consequence of the engine having stood idle for a sufficient time for the oil in the upper portion of the engine to have drained into the reservoir 53 through the pumps 33 and 34. During running of the engine, flooding of the combustion chambers and cylinders is prevented by the action of the pump 34 which maintains the reservoir 53 substantially empty of oil.

Preparatory to an accurate determination of the amount of oil in the lubricating system, the vehicle is placed in a level position, the engine operated for a sufficient length of time for the pump 34 to return to the reservoirs 50 and 75 any oil which may have drained into the reservoir 53, and the engine set in advance of measurement by the rod 79 to run at a low speed at which the air passing through the reservoir 75 will not greatly agitate the oil in such reservoir or build up large pressure surges. If the rod 79 is then withdrawn, wiped off, reinserted, and withdrawn after the fashion employed in measuring oil in the conventional automobile engine, the oil mark on the rod 79 will show with a fair amount of accuracy the amount of oil in the lubricating system. The replenishment of the oil used up in the operation of the engine is accomplished by introducing oil into the crankcase by way of the filling neck 80, and is preferably done while the engine is running so that the oil can be measured from time to time.

The lubricating system is drained of oil by removing two plugs 87 and 88 in the bottom of the crankcase, and the plug 59 at the lower end of the duct 48. To fill the lubricating system after it has been drained of oil, the amount of oil required to fill the lubricating system is poured into the filling neck while the engine is idle.

The cooling water chamber 63 is included in a circulatory water system embodying a radiator 89 at the forward end of the bus and including means for cooling the cylinders of the engine. It is connected through conduits 90 with passages formed in the casting 12 and through a pipe 91 with a conduit leading to the radiator 89, the arrangement being such that water is delivered from the radiator 89 through the chamber 63 into the cooling passages of the engine, and then returned to the radiator.

If desired, a single conduit connecting the bottom of the reservoir 75 with the top of the reservoir 50 may be substituted for the conduits 76 and 77 without affecting the efficiency of the lubricating system other than to reduce the accuracy with which the oil in the system can be measured. The reduction in accuracy arises from the oil in the supply reservoir being more greatly agitated at the time of measurement in consequence of all of the air pumped through the system being delivered into such reservoir beneath the oil level.

While the foregoing description is necessarily of a detailed character, in order that the invention may be fully set forth, it is to be understood that the specific terminology employed is not to be construed as being restrictive or confining, and that various modifications may be resorted to without departing from the scope and spirit of the invention as defined in the following claims.

What I claim is:

1. In a horizontal dry sump engine of small depth and intended to be supported beneath the flooring of an automobile, said engine being constructed with a lubricating system comprising a supply reservoir located in the upper part of the engine, a receiving reservoir located in the lower part of the engine, a third reservoir forming a separate unit from said engine located at one side of said engine at a higher level than the flooring of the automobile, a conduit connecting said third reservoir with said supply reservoir communicating at one end with the bottom of said third reservoir and at its other end with the bottom of said supply reservoir, a second conduit connecting said third reservoir with said supply reservoir communicating at one end with the top of said third reservoir and at its other end with the top of said supply reservoir, a third conduit communicating at its upper end with the upper portion of said third reservoir and at its lower end with said receiving reservoir, means for delivering oil from said supply reservoir to the bearings of said engine, and means for delivering oil from said receiving reservoir into said supply reservoir capable of effecting the delivery of more oil from said receiving reservoir than is received therein from said supply reservoir.

2. In a horizontal dry sump engine of small depth and comprising a lubricating system comprising a supply reservoir and a receiving reservoir contained within said engine, a third reservoir forming a separate unit from said engine located at one side of said engine at a higher level than said supply reservoir, a conduit connecting the bottom of said third reservoir with the top of said supply reservoir, a conduit leading from a point adjacent said third reservoir to the bottom of said engine and communicating at its lower end with said receiving reservoir and also communicating with the upper portion of said third reservoir, means for delivering oil from said supply reservoir to the bearings of said engine and means for delivering oil from said receiving reservoir into said supply reservoir.

3. A lubricating system for an internal combustion engine comprising a supply reservoir and a receiving reservoir contained within the engine, a third reservoir forming a separate unit from the engine located at a higher level than said supply reservoir, fluid conveying means connecting said third reservoir with said supply reservoir, a conduit communicating at its lower end with said receiving reservoir and also with the upper portion of said third reservoir, means for delivering oil from said supply reservoir to the bearings of the engine, and means for delivering oil from said receiving reservoir into said supply reservoir.

4. A lubricating system for an internal combustion engine comprising a supply reservoir located in the upper part of the engine, a receiving reservoir located in the lower part of the engine, a third reservoir forming a separate unit from said engine located at one side of said engine at a higher level than said supply reservoir, a conduit connecting said third reservoir with said supply reservoir communicating at one end with the bottom of said third reservoir and at its other end with the bottom of said supply reservoir, a second conduit connecting said third reservoir with said supply reservoir communicating at one end with the top of said third reservoir and at its other end with the top of said supply reservoir, means for delivering oil from said supply reservoir to the bearings of said engine, and means for delivering oil from said receiving reservoir into said supply reservoir capable of effecting the delivery of more oil from said receiving reservoir than is received therein from said supply reservoir.

5. A lubricating system for an internal combustion engine comprising a supply reservoir located in the upper part of the engine, a receiving reservoir located in the lower part of the engine, a third reservoir forming a separate unit from said engine located at one side of said engine at a higher level than said supply reservoir, a conduit connecting said third reservoir with said supply reservoir communicating at one end with the bottom of said third reservoir and at its other end with the bottom of said supply reservoir, a second conduit connecting said third reservoir with said supply reservoir communicating at one end with the top of said third reservoir and at its other end with the top of said supply reservoir, a filling conduit leading from a point adjacent said third reservoir to the bottom of said engine and communicating at its lower end with said receiving reservoir and adjacent its top end with the upper portion of said third reservoir, means for delivering oil from said supply reservoir to the bearings of said engine, and means for delivering oil from said receiving reservoir into said supply reservoir capable of effecting the delivery of more oil from said receiving reservoir than is received therein from said supply reservoir.

WILLIAM R. SPILLER.